Nov. 25, 1952  A. WYZENBEEK  2,618,940
FLEXIBLE SHAFT HANDPIECE COUPLING
Filed June 25, 1948
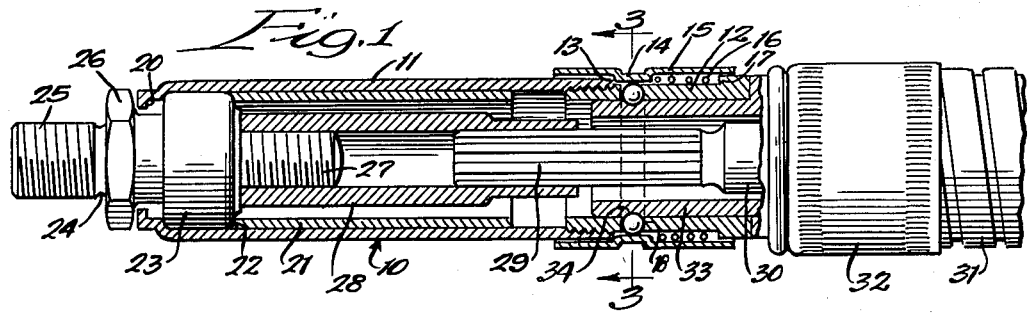
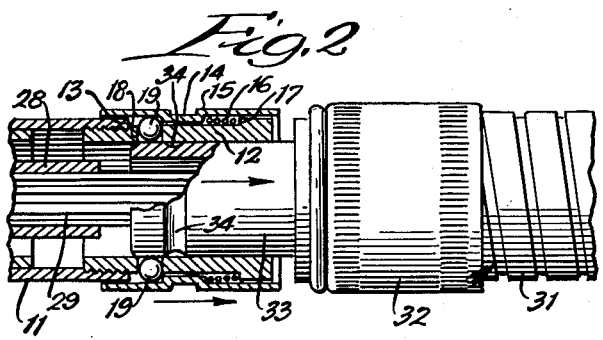
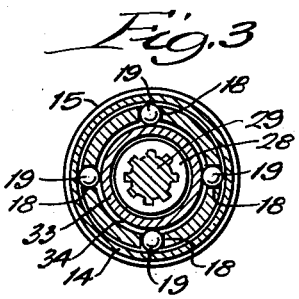
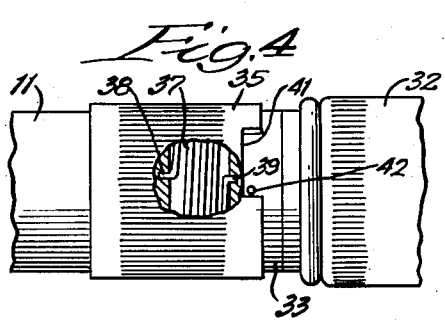
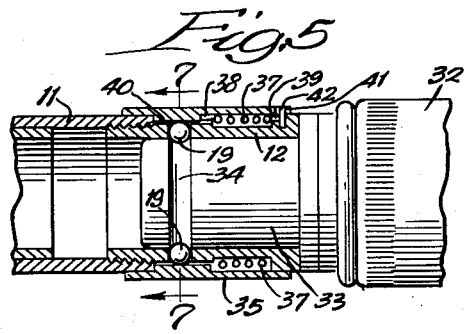
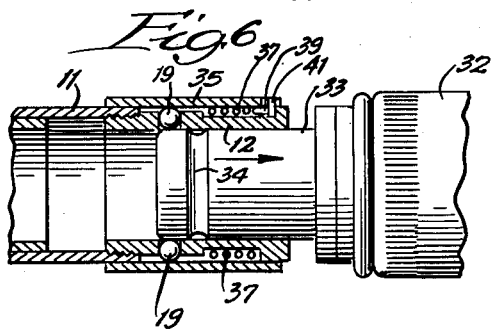
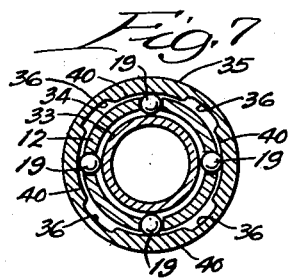
Inventor:
Andrew Wyzenbeek,
By Dawson, Ooms, Booth and Spangenberg,
Attorneys.

Patented Nov. 25, 1952

2,618,940

UNITED STATES PATENT OFFICE 2,618,940

FLEXIBLE SHAFT HANDPIECE COUPLING

Andrew Wyzenbeek, Chicago, Ill.

Application June 25, 1948, Serial No. 35,140

1 Claim. (Cl. 64—4)

This invention relates to a flexible shaft handpiece coupling. The invention is particularly useful in providing for the quick detachment of a handpiece in which a tool shaft is supported.

In flexible shaft structures, threaded coupling members are employed in the joining of the end of the flexible shafts to the tool-end shaft supported within the handpiece. Such coupling structure requires time to operate and is tedious but have been regarded as essential since quick coupling structures lend themselves to accidental separation and might prove disastrous. This is unfortunate because in the use of flexible shaft driven tools, there is need for extremely quick removal and substitution of handpiece connections.

An object of the present invention is to provide a flexible shaft handpiece structure in which a quick separation of a handpiece from the flexible shaft housing is effected while at the same time providing a structure which prevents accidental separation of the parts. A further object is to provide in a flexible shaft structure, quick acting coupling means for the coupling or separation of a handpiece and flexible shaft housing as well as for the ready connection thereof. A still further object is to provide a structure in which a handpiece and flexible shaft housing are provided with complementary locking members which are readily separated or joined while at the same time guiding the end of the flexible shaft and the end of the driven shaft for disengagement and engagement. A still further object is to provide a coupler structure for the handpiece and flexible shaft housing, the arrangement being such that both hands are required for separation of the parts, thus preventing accidental separation, etc. Other specific objects and advantages will appear as the specification proceeds.

The invention is illustrated, in preferred embodiments, by the accompanying drawing, in which—

Fig. 1 is a broken longitudinal sectional view of a flexible shaft coupling structure embodying my invention; Fig. 2, a view similar to Fig. 1 but showing the parts in disconnected relation; Fig. 3, a transverse sectional view showing the balls in locking position, the section being taken as indicated at line 3 of Fig. 1; Fig. 4, a broken plan view of a modified form of structure embodying my invention; Fig. 5, a broken and longitudinal sectional view of the structure shown in Fig. 4, the balls being shown in locking position; Fig. 6, a view similar to Fig. 5 but showing the parts in unlocked position; and Fig. 7, a transverse sectional view, the section being taken as indicated at line 7 of Fig. 5.

In the illustration given in Figs. 1 to 3 inclusive, 10 designates a handpiece. The handpiece 10 includes a cylindrical member 11 and also a socket member 12, the members being threadedly engaged, as indicated in Fig. 1. The rear end of the cylinder 11 provides a stop 13 which normally engages an inwardly extending rib or cam 14 of the slide sleeve 15. A spring 16 engages a shoulder 17 at the rear of the socket member 12 and normally urges the rib 14 of sleeve 15 against the forward stop 13.

The socket member 12 is provided at spaced points with openings 18 extending therethrough and in which are mounted the balls 19.

The cylinder 11 is turned inwardly at its forward end to provide a shoulder 20. A second cylinder 21 is received within the cylinder 11 and is welded thereto, thus providing a stop or shoulder 22 at its forward end. Between the shoulders 20 and 22 is mounted a roller 23 carried by the driven shaft 24. The driven shaft 24 may be of any suitable type of structure. In the illustration given, the member 24 is provided with a threaded forward end 25 and with a nut flange 26 just forward of the cylinder 11. In the illustration given, the member 24 is provided with a threaded rear end 27 threadedly engaging the tube 28. The tube 28 is provided at its rear end with internal splines adapted to interlock and engage the exterior splines 29 on the rear end of the flexible shaft member 30.

The flexible shaft 30 is housed within a housing 31 having at its forward end a hollow fitting 32. Formed integrally with the hollow fitting is a forwardly extending nose member 33 provided with an annular locking groove 34.

Operation

In the operation of the structure shown in Figs. 1 to 3 inclusive, the handpiece is held in the left hand while the slidable sleeve 15 is drawn back with the right hand. The nose 33 may then be inserted within the socket member 12 while at the same time the splined end of the flexible shaft 30 is brought into engagement with the internal splines of the tube 28. The balls 19 slip into the annular recess 34 of the nose 33 and upon release of the slide 15, the inwardly extending rib 14 locks the balls in their inner position.

For releasing the parts, a similar operation is employed, requiring the use of two hands. The handpiece is held with the left hand and the right hand slides back the sleeve 15 to permit the balls 19 to move outwardly, as illustrated in Fig. 2. The parts may then be readily separated. In separated position, the balls 19 are retained within the sleeve 15 by a slightly inwardly turned portion of the socket member about the inner portions of the balls.

From the foregoing, it will be understood that accidental separation of the parts cannot be brought about because in the handling of the tool, moving the same forwardly about the work to be treated, no forward movement of the slide 15 can be effected because of the engagement of the rib 14 with the stop 13. The only way in which the separation can be accomplished is by an effort which must be conscious, namely, that of holding the handpiece in one hand while moving the slide 15 in a rearward direction.

In the modification shown in Figs. 4 to 7 inclusive, a similar conscious effort must be made to effect separation of the parts. In this structure, the sleeve 35 is mounted for rotary movement and it is provided with spaced recesses 36, as shown more clearly in Fig. 7.

The sleeve 35 is provided with a torsion spring 37 coiled within the space between the sleeve 35 and the socket member 12. One end 38 of the spring is connected to the socket member 12 while the rear end 39 is connected to the sleeve, and the spring is so adjusted as to maintain the ring in the position shown in Fig. 7 in which the cam portion 40 of the ring normally urges the balls 19 into engagement with the annular groove 34 of the nose 33.

In order to accurately position the sleeve 35 in either the cam or locking position or in the recess or release position, I provide the sleeve 35 with a slot 41 having shoulders at each end engageable with a pin 42 fixed to the nose 33 of the fitting 32. Thus by rotating the sleeve 35 from its normal position to a position in which the pin 42 engages the opposite shoulder of the recess 41, a recess 36 will be brought into alignment with each of the balls 19 to permit them to move outwardly to the release position shown in Fig. 6.

In the operation of the modified structure shown in Figs. 4 to 7 inclusive, the handpiece 11 is grasped in one hand and the other hand is used to rotate the sleeve 35 to unlocking position with the recesses 36 aligned with the balls 19. The parts may now be engaged or disengaged. When the parts are coupled together, the balls 19 enter the annular recess 34 of the nose 33 and upon release of the sleeve 35, it swings to the position illustrated in Fig. 5. Here the cam portions 40 of the sleeve press the balls into locking engagement with the annular groove 34. Similarly, in releasing the parts, the sleeve 35 is swung to bring the opposite shoulder of the recess 41 into engagement with the pin 42 and thereby to align the recesses 36 with the balls 19. The parts may then be readily separated. In effecting the separation, however, it will be observed that two hands are required and that there is no way in which separation may be accidentally brought about in the moving of the handpiece forward and backward while using the tool which is normally threaded onto the portion 25 of shaft 24.

It will be understood that the socket member having balls in the openings therein may be attached equally as well to the flexible shaft end as to the handpiece, and the operation of the coupling or uncoupling of the handpiece would be carried out in the same manner. In this case, the hollow fitting receiving the end portion having the extending nose would be part of the handpiece instead of part of the flexible shaft. Further, if desired, the coupling structure may be used to unite two flexible shafts.

The shafts may be equipped with any type of interlocking connections. A hexagon connection may be used, as shown in the drawings. If desired, the end of one rod may be relatively square and the corresponding socket in the other rod may be square for receiving the squared end. Any type of structure employing splines or tubes and socket connections may be employed, it being sufficient that there be an interlocking connection between the shafts.

While in the foregoing specification, I have set forth certain structures in considerable detail for the purpose of illustrating the invention, it will be understood that such structures may be varied widely by those skilled in the art without departing from the spirit of my invention.

I claim:

In a safety flexible shaft coupling, a handpiece, a driven shaft in said handpiece and equipped with an internally-splined tube, a flexible shaft casing, a hollow fitting receiving the end portion of said casing and having a forwardly-extending nose portion equipped with an annular groove, a flexible shaft in said fitting having a splined forward end telescopically engageable with said splined tube, said handpiece being equipped with a socket member having openings extending therethrough, balls in said openings, a rotatably-mounted sleeve enclosing said balls, said sleeve being provided interiorly with circumferentially spaced cam and recessed portions, spring means urging said sleeve toward a position in which the cam portions engage said balls to hold them in engagement with said groove, and cooperating means on said sleeve and handpiece for limiting the rotation of said sleeve and to bring about an alignment between the recessed portions thereof with said balls.

ANDREW WYZENBEEK.

REFERENCES CITED

The following references are of record in the file of this patent:

UNITED STATES PATENTS

| Number | Name | Date |
| --- | --- | --- |
| 666,509 | Furbish | Jan. 22, 1901 |
| 666,511 | Furbish | Jan. 22, 1901 |
| 1,868,587 | Richards | July 26, 1932 |
| 1,943,980 | Mall | Jan. 16, 1934 |
| 2,008,894 | Bergstrom | July 23, 1935 |
| 2,473,286 | Mall | June 14, 1949 |